United States Patent
Takeuchi et al.

(10) Patent No.: US 12,104,061 B2
(45) Date of Patent: Oct. 1, 2024

(54) UV CURABLE SILICONE COMPOSITION AND AN ENCAPSULANT OR A SHEET FILM THEREOF

(71) Applicants: DuPont Specialty Materials Korea Ltd., Chungcheongnam-do (KR); DuPont Electronic Materials International, LLC, Marlborough, MA (US); DuPont Toray Specialty Materials Kabushiki Kaisha, Tokyo (JP)

(72) Inventors: Shunya Takeuchi, Chiba (JP); Anna Ya Ching Feng, Taoyuan (TW); Yutaka Oka, Chiba (JP); Jung Hye Chae, Gyeonggi-do (KR)

(73) Assignees: DuPont Toray Specialty Materials Kabushiki Kaisha, Tokyo (JP); DuPont Electronic Materials International, LLC, Marlborough, MA (US); DuPont Specialty Materials Korea Ltd., Chungcheongnam-do (KR)

( * ) Notice: Subject to any disclaimer, the term of this patent is extended or adjusted under 35 U.S.C. 154(b) by 0 days.

(21) Appl. No.: 18/219,833

(22) Filed: Jul. 10, 2023

(65) Prior Publication Data

US 2023/0348721 A1     Nov. 2, 2023

Related U.S. Application Data

(62) Division of application No. 17/174,480, filed on Feb. 12, 2021, now Pat. No. 11,781,016.

(30) Foreign Application Priority Data

Feb. 28, 2020   (JP) ................. 2020-033944

(51) Int. Cl.
  *C08L 83/04*   (2006.01)
  *C08G 77/00*   (2006.01)
  (Continued)

(52) U.S. Cl.
  CPC .............. *C08L 83/04* (2013.01); *C08G 77/20* (2013.01); *C08G 77/28* (2013.01); *C08G 77/80* (2013.01);
  (Continued)

(58) Field of Classification Search
  CPC ....... H01L 33/56; C09K 3/10; C08L 2312/06; C08L 2205/03; C08L 2205/025;
  (Continued)

(56) References Cited

U.S. PATENT DOCUMENTS

| 4,591,608 A | 5/1986 | Okinoshima |
| 4,810,731 A | 3/1989 | Hida et al. |

(Continued)

FOREIGN PATENT DOCUMENTS

| CN | 106470971 A | 3/2017 |
| JP | H 01-259065 A | 10/1989 |

(Continued)

OTHER PUBLICATIONS

English language abstract and machine-assisted English translation for JPH 01-259065 A extracted from espacenet.com database on Nov. 28, 2023, 5 pages.
English language abstract and machine-assisted English translation for JP 2008-520809 A extracted from espacenet.com database on Nov. 28, 2023, 1 page.
English language abstract and machine-assisted English translation for JP 2016-150958 A extracted from espacenet.com database on Nov. 28, 2023, 21 pages.

(Continued)

*Primary Examiner* — Sanza L. McClendon
(74) *Attorney, Agent, or Firm* — Howard & Howard Attorneys PLLC

(57) ABSTRACT

A UV curable silicone composition has exceptional curability by ultraviolet irradiation. The UV curable silicone composition includes (A) an organopolysiloxane composition selected from the following: (A-1) an organopolysiloxane composition comprising a linear organopolysiloxane in which both ends of the molecular chain are capped with alkenyl groups and/or a branched organopolysiloxane containing at least 2 alkenyl groups at the ends of the molecular chain, and an organopolysiloxane containing at least 2 thiol groups in side-chains of the molecular chain, wherein the thiol group content is 1% by mass or more per molecule, (A-2) an organopolysiloxane composition comprising a linear organopolysiloxane in which both ends of the molecular chain are capped with thiol groups, wherein the thiol group content is 1% by mass or more per molecule, and an organopolysiloxane containing at least 2 alkenyl groups in side-chains of the molecular chain and/or a resinous organopolysiloxane containing at least 2 alkenyl groups at the ends of the molecular chain, or (A-3) an organopolysiloxane composition comprising an alkenyl group- and aryl group-containing organopolysiloxane and a multifunctional thiol compound, but furthermore comprising an alkenyl group-containing resinous organopolysiloxane when the multifunctional thiol compound contains only a bifunctional thiol compound, and (B) a silicone-compatible photo-initiator comprising a compound selected from the following: (B-1) an alpha-hydroxyacetophenone, (B-2) a combination of an alpha-hydroxyacetophenone and an alpha-aminoalkylphenone, or (B-3) a combination of an alpha-hydroxyacetophenone and a mono-acylphosphine oxide, wherein the ratio between the thiol groups and alkenyl groups (SH/Vi ratio) included in the organopolysiloxane composition is 0.6 or more.

17 Claims, No Drawings

(51) Int. Cl.
*C08G 77/20* (2006.01)
*C08G 77/28* (2006.01)
*C08K 5/132* (2006.01)
*C08K 5/18* (2006.01)
*C08K 5/5397* (2006.01)

(52) U.S. Cl.
CPC ................ *C08K 5/132* (2013.01); *C08K 5/18* (2013.01); *C08K 5/5397* (2013.01); *C08L 2201/08* (2013.01); *C08L 2201/10* (2013.01); *C08L 2203/16* (2013.01); *C08L 2203/206* (2013.01); *C08L 2205/025* (2013.01); *C08L 2205/03* (2013.01); *C08L 2312/06* (2013.01)

(58) Field of Classification Search
CPC ........... C08L 2203/206; C08L 2203/16; C08L 2201/10; C08L 2201/08; C08L 83/04; C08K 5/5397; C08K 5/18; C08K 5/132; C08J 5/18; C08G 77/80; C08G 77/44; C08G 77/20; C08G 77/28; C08G 77/08
See application file for complete search history.

(56) References Cited

U.S. PATENT DOCUMENTS

| | | |
|---|---|---|
| 8,716,362 B2 | 5/2014 | Ono et al. |
| 9,732,239 B2 | 8/2017 | Clapp et al. |
| 9,994,754 B2 | 6/2018 | Clough |
| 10,005,851 B2 | 6/2018 | Kanehara et al. |
| 2006/0128826 A1 | 6/2006 | Ellison et al. |
| 2021/0269642 A1 | 9/2021 | Takeuchi et al. |

FOREIGN PATENT DOCUMENTS

| | | | |
|---|---|---|---|
| JP | 2002-371261 A | 12/2002 | |
| JP | 2008-520809 A | 6/2008 | |
| JP | 2012-144704 A | 8/2012 | |
| JP | 2013-253179 A | 12/2013 | |
| JP | 2016-060782 A | 4/2016 | |
| JP | 2016-150958 A | 8/2016 | |
| JP | 2017-502102 A | 1/2017 | |
| JP | 2017-508853 A | 3/2017 | |
| KR | 101224780 B1 | 1/2013 | |
| WO | WO-2005044949 A1 * | 5/2005 | ........... C09K 19/544 |
| WO | WO-2005044950 A1 * | 5/2005 | ........... C09K 19/544 |
| WO | 2013112254 A1 | 8/2013 | |
| WO | 2019145273 A1 | 8/2019 | |
| WO | WO-2021158327 A1 * | 8/2021 | ............. C08G 77/20 |

OTHER PUBLICATIONS

English language abstract for CN 106470971 A extracted from espacenet.com database on Jul. 21, 2023, 1 page.
English language abstract and machine-assisted English translation for JP 2002-371261 A extracted from espacenet.com database on Feb. 17, 2021, 8 pages.
English language abstract for JP 2012-144704 A extracted from espacenet.com database on Feb. 17, 2021, 2 pages.
English language abstract and machine-assisted English translation for JP 2013-253179 A extracted from espacenet.com database on Feb. 17, 2021, 17 pages.
English language abstract and machine-assisted English translation for JP 2016-060782 A extracted from espacenet.com database on Feb. 17, 2021, 16 pages.
English language abstract for JP 2017-502102 A extracted from espacenet.com database on Feb. 17, 2021, 2 pages.
English language abstract for JP 2017-508853 A extracted from espacenet.com database on Feb. 17, 2021, 1 page.
English language abstract and machine-assisted English translation for KR 101224780 B1 extracted from espacenet.com database on Feb. 17, 2021, 18 pages.

* cited by examiner

UV CURABLE SILICONE COMPOSITION AND AN ENCAPSULANT OR A SHEET FILM THEREOF

CROSS-REFERENCE TO RELATED APPLICATION

The present application is a Divisional application of U.S. patent application Ser. No. 17/174,480, filed Feb. 12, 2021, which claims priority to and all the benefits of Japanese Application No. 2020-033944 filed on Feb. 28, 2020, which are hereby expressly incorporated herein by reference in their entirety.

DESCRIPTION

Technical Field

The present disclosure relates to an ultraviolet curable silicone composition, and to an LED-related member, particularly an encapsulant or a sheet film, that is obtained by curing the ultraviolet curable silicone composition by exposure to ultraviolet rays.

BACKGROUND ART

When curable silicone compositions are cured, they form cured products having excellent heat resistance, cold resistance, electrical insulation, weather resistance, water repellency, and transparency, and are therefore used in a wide range of industrial fields. Compared to other organic materials, the cured products of such curable silicone compositions are less prone to discolouration, with less change in their physical properties, thus making them suitable for optical materials.

However, a problem with conventional thermosetting types of curable silicone compositions is that heating results in a cured product with substantial warping or dimensional errors. In particular, when conventional thermosetting curable types of silicone compositions are used in an attempt to encapsulate flexible substrates on which semiconductor chips have been mounted, or are used as transfer-stamped sheet films in a mass transfer process when chips are being mounted, some potential problems are that heating may result in substantial warping or dimensional errors in the cured product, making it impossible to accurately encapsulate or mount the semiconductor chips. Other potential problems are that thermosetting types of curable silicone compositions must be heated at elevated temperatures for long periods of time in order to be cured, resulting in low processing efficiency or damage to electronic components.

It has therefore been proposed that ultraviolet curable silicone compositions should be used as the curable silicone composition for electronic components such as semiconductor devices. For example, Patent Documents 1 through 8 disclose various ultraviolet curable silicone compositions.

PRIOR ART DOCUMENTS

Patent Documents

[Patent Document 1] Japanese Translation of PCT International Application Publication No. 2017-502102
[Patent Document 2] WO 2013/112254
[Patent Document 3] Japanese Translation of PCT International Application Publication No. 2017-508853
[Patent Document 4] Korean Patent 101224780
[Patent document 5] Japanese Unexamined Patent Publication No. 2013-253179
[Patent document 6] Japanese Unexamined Patent Publication No. 2016-60782
[Patent document 7] Japanese Unexamined Patent Publication No. 2002-371261
[Patent document 8] Japanese Unexamined Patent Publication No. 2012-144704

SUMMARY OF THE INVENTION

Problem to be Solved by the Invention

However, conventional ultraviolet curable silicone compositions still have the problems of poor curability noted above and poor dimensional stability.

An object of the present disclosure is to provide a UV curable silicone composition having exceptional curability by ultraviolet irradiation.

Another object of the present disclosure is to provide a sheet film or encapsulant having exceptional dimensional stability and minimal warping, that is obtained by curing the UV curable silicone composition.

Means for Solving the Problems

As a result of extensive research to solve the above-mentioned problems, the inventors arrived at the present disclosure upon the surprising discovery that a UV curable silicone composition having exceptional curability by ultraviolet irradiation can be obtained by combining a organopolysiloxane composition comprising a specific thiol functional organopolysiloxane, or a specific thiol compound, with a specific photo-initiator.

The present disclosure thus relates to a UV curable silicone composition, comprising:
(A) an organopolysiloxane composition selected from the following:
  (A-1) an organopolysiloxane composition comprising a linear organopolysiloxane in which both ends of the molecular chain are capped with alkenyl groups and/or a branched organopolysiloxane containing at least 2 alkenyl groups at the ends of the molecular chain, and an organopolysiloxane containing thiol groups in side-chains of the molecular chain, wherein the thiol group content is 1% by mass or more per molecule,
  (A-2) an organopolysiloxane composition comprising a linear organopolysiloxane in which both ends of the molecular chain are capped with thiol groups, wherein the thiol group content is 1% by mass or more per molecule, and an organopolysiloxane containing alkenyl groups in side-chains of the molecular chain and/or a resinous organopolysiloxane containing at least 2 alkenyl groups at the ends of the molecular chain, or
  (A-3) an organopolysiloxane composition comprising an alkenyl group- and aryl group-containing organopolysiloxane and a multifunctional thiol compound, but furthermore comprising an alkenyl group-containing resinous organopolysiloxane when the multifunctional thiol compound contains only a bifunctional thiol compound, and (B) a silicone-miscible photo-initiator comprising a compound selected from the following:
  (B-1) an alpha-hydroxyacetophenone,
  (B-2) a combination of an alpha-hydroxyacetophenone and an alpha-aminoalkylphenone, or
  (B-3) a combination of an alpha-hydroxyacetophenone and a mono-acylphosphine oxide, wherein the ratio between the thiol groups (—SH groups) and alkenyl groups (SH/Vi ratio) included in the organopolysiloxane composition is 0.6 or more.

The organopolysiloxane containing at least 2 thiol groups (—SH groups) in side-chains of the molecular chain in component (A-1) is preferably a linear or branched structure.

The organopolysiloxane containing at least 2 alkenyl groups in side-chains of the molecular chain in component (A-2) is preferably a linear structure.

The multifunctional thiol compound in component (A-3) is preferably a compound containing 2 to 6 functional thiol groups.

The content of the thiol groups (—SH groups) and alkenyl groups in component (A) of the organopolysiloxane composition is preferably 0.6 to 5 mols thiol groups per mol alkenyl groups.

The photo-initiator (B-1) preferably furthermore contains a compound having an acetophenone structure other than alpha-hydroxyacetophenone.

The content of component (B) is preferably 0.001% by mass to 5% by mass based on the total mass of the UV curable silicone composition.

The present disclosure also relates to an encapsulant or sheet film comprising the cured product of the UV curable silicone composition of the present disclosure.

Effects of the Invention

The UV curable silicone composition according to the present disclosure exhibits exceptional curability by ultraviolet irradiation. A cured product having exceptional dimensional stability and minimal warping can thus be formed. The encapsulant and sheet film according to the present disclosure also have exceptional dimensional stability and minimal warping, thus making it possible to provide highly reliable electronic devices.

MODE FOR CARRYING OUT THE INVENTION

UV Curable Silicone Composition

The UV curable silicone composition according to the present disclosure comprises
  (A) an organopolysiloxane composition selected from the following:
    (A-1) an organopolysiloxane composition comprising a linear organopolysiloxane in which both ends of the molecular chain are capped with alkenyl groups and/or a branched organopolysiloxane containing at least 2 alkenyl groups at the ends of the molecular chain, and an organopolysiloxane containing thiol groups in side-chains of the molecular chain, wherein the thiol group content is 1% by mass or more per molecule,
    (A-2) an organopolysiloxane composition comprising a linear organopolysiloxane in which both ends of the molecular chain are capped with thiol groups, wherein the thiol group content is 1% by mass or more per molecule, and an organopolysiloxane containing alkenyl groups in side-chains of the molecular chain and/or a resinous organopolysiloxane containing at least 2 alkenyl groups at the ends of the molecular chain, or
    (A-3) an organopolysiloxane composition comprising an alkenyl group- and aryl group-containing organopolysiloxane and a multifunctional thiol compound, but furthermore comprising an alkenyl group-containing resinous organopolysiloxane when the multifunctional thiol compound contains only a bifunctional thiol compound, and
  (B) a silicone-miscible photo-initiator comprising a compound selected from the following:
    (B-1) an alpha-hydroxyacetophenone,
    (B-2) a combination of an alpha-hydroxyacetophenone and an alpha-aminoalkylphenone, or
    (B-3) a combination of an alpha-hydroxyacetophenone and a mono-acylphosphine oxide, wherein the ratio between the thiol groups (—SH groups) and alkenyl groups (SH/Vi ratio) included in the organopolysiloxane composition is 0.6 or more.

The components of the UV curable silicone composition of the present disclosure are described in detail below.

(A) Organopolysiloxane Composition

Component (A) is an organopolysiloxane composition, which is a main component of the UV curable silicone composition of the present disclosure. In the present disclosure, component (A) is selected from the following (A-1) through (A-3):
  (A-1) an organopolysiloxane composition comprising a linear organopolysiloxane in which both ends of the molecular chain are capped with alkenyl groups and/or a branched organopolysiloxane containing at least 2 alkenyl groups at the ends of the molecular chain, and an organopolysiloxane containing at least 2 thiol groups in side-chains of the molecular chain, wherein the thiol group content is 1% by mass or more per molecule,
  (A-2) an organopolysiloxane composition comprising a linear organopolysiloxane in which both ends of the molecular chain are capped with thiol groups, wherein the thiol group content is 1% by mass or more per molecule, and an organopolysiloxane containing at least 2 alkenyl groups in side-chains of the molecular chain and/or a resinous organopolysiloxane containing at least 2 alkenyl groups at the ends of the molecular chain, or
  (A-3) an organopolysiloxane composition comprising an alkenyl group- and aryl group-containing organopolysiloxane and a multifunctional thiol compound, but furthermore comprising an alkenyl group-containing resinous organopolysiloxane when the multifunctional thiol compound contains only a bifunctional thiol compound.

The components are described in detail below.

Component (A-1) is an organopolysiloxane composition comprising a linear organopolysiloxane in which both ends of the molecular chain are capped with alkenyl groups and/or a branched organopolysiloxane containing at least 2 alkenyl groups at the ends of the molecular chain, and an organopolysiloxane containing at least 2 thiol groups in side-chains of the molecular chain, wherein the thiol group content is 1% by mass or more per molecule, The linear organopolysiloxane in which both ends of the molecular chain are blocked with alkenyl groups in component (A-1) is preferably represented by structural formula (I): $R^1R^2{}_2SiO(R^2{}_2SiO)_nSiR^1R^2{}_2$; in formula (I), $R^1$ is an alkenyl group, $R^2$ are each independently a monovalent hydrocarbon group, and n is a numerical value representing a viscosity of 10 mPa or more. Here, 1 kind or combinations of 2 or more kinds of linear organopolysiloxanes in which both ends of the molecular chain are capped with alkenyl groups may be used.

The branched organopolysiloxane containing at least 2 alkenyl groups at the ends of the molecular chain in component (A-1) is preferably represented by average unit formula (II): $(R^2_3SiO_{1/2})_a(R^2_2SiO_{2/2})_b(R^2SiO_{3/2})_c(SiO_{4/2})_d$ $(XO_{1/2})_e$; in formula (II), $R^2$ is the same as the above, but at least 2 of $R^2$ among the $R^2$ in the unit $(R^2_3SiO_{1/2})$ are alkenyl groups per molecule, X is a hydrogen atom or an alkyl group, and a, b, c, d, and e are 0≤a≤1.0, 0≤b≤0.5, 0≤c≤0.5, 0≤d≤1.0, and 0≤e≤0.4, and a+b+c+d is preferably a value that =1.0. Also, c+d can be >0. One kind or combinations of 2 or more kinds of branched organopolysiloxane containing at least 2 alkenyl groups at the ends of the molecular chain may be used. In other words, the branched organopolysiloxane containing at least 2 alkenyl groups at the ends of the molecular chain in component (A-1) contains alkenyl groups in M units. D, T, and/or Q units may contain but preferably do not contain alkenyl groups.

In the present specification, the viscosity of the organopolysiloxane component can be determined at 25° C. using a rotary viscometer per JIS K7117-1.

In the above formulas (I) and (II), $R^1$ and $R^2$ include alkenyl groups. Examples of alkenyl groups include $C_{2-12}$ alkenyl groups such as a vinyl group, an allyl group, a butenyl group, a pentenyl group, a hexenyl group, a heptenyl group, an octenyl group, a nonenyl group, a decenyl group, an undecenyl group, and a dodecenyl group; $C_{2-6}$ alkenyl groups are preferred, and vinyl groups are particularly preferred.

Examples of monovalent hydrocarbon groups other than alkenyl groups represented by $R^2$ in formulas (I) and (II) include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, and bromine atoms; $C_{1-6}$ alkyl groups are preferred, and methyl groups are particularly preferred. In one embodiment, $R^2$ is a monovalent hydrocarbon group other than a phenyl group. In another embodiment, $R^2$ is a monovalent hydrocarbon group other than an aryl group.

In component (A-1), the amount of alkenyl groups contained in the linear organopolysiloxane in which both ends of the molecular chain are capped with alkenyl groups is not particularly limited, but alkenyl groups are preferably 0.01 to 50 mol %, 0.03 to 40 mol %, or 0.05 to 32 mol % of the total of functional groups R. The alkenyl group content can be determined by analysis such as Fourier transform infrared spectrophotometry (FT-IR) or nuclear magnetic resonance (NMR).

Examples of the structure of the organopolysiloxane containing at least 2 thiol groups in side-chains of the molecular chain in component (A-1) are linear, linear with some branching, branched, cyclic, and 3D network structures. One kind or combinations of 2 or more kinds of organopolysiloxanes containing at least 2 thiol groups in side-chains of the molecular chain in component (A-1) may be used. Component (A-1) preferably comprises an organopolysiloxane containing at least 2 thiol groups in side-chains of the molecular chain of the linear structure.

The organopolysiloxane containing at least 2 thiol groups in side-chains of the molecular chain preferably consists only of units M, D, and T among the following general formulas of organopolysiloxanes: siloxane unit (unit M) represented by general formula $R^3SiO_{1/2}$, siloxane unit (unit D) represented by general formula $R^2SiO_{2/2}$, siloxane unit (unit T) represented by general formula $RSiO_{3/2}$, and siloxane unit (unit Q) represented by formula $SiO_{4/2}$.

The organopolysiloxane containing at least 2 thiol groups in side-chains of the molecular chain in component (A-1) is preferably represented by average unit formula (III): $(R^2_3SiO_{1/2})_a(R^3_2SiO_{2/2})_b(R^3SiO_{3/2})_c(SiO_{4/2})_d(XO_{1/2})_e$. In formula (III), $R^2$ is the same as above, $R^3$ is a monovalent hydrocarbon group or thiol group other than an alkenyl group, but at least 2 of $R^3$ are thiol groups per molecule, X is a hydrogen atom or alkyl group, a, b, c, d, and e are 0≤a≤1.0, 0≤b≤1.0, 0≤c<0.9, 0≤d<0.5, and 0≤e<0.4, and a+b+c+d is preferably a value that =1.0.

In formula (III), $R^3$ is a monovalent hydrocarbon group or thiol group other than an alkenyl group; examples of monovalent hydrocarbon groups other than alkenyl groups are the same as for the monovalent hydrocarbon groups represented by $R^2$. Examples of thiol groups include the structure $-(CH_2)_x-SH$, where x is an integer of 1 to 30. Preferred examples of alkyl groups represented by X include $C_{1-3}$ alkyl groups, specifically, methyl, ethyl, and propyl groups.

In formula (III), a is preferably in the range of 0≤a≤0.9, more preferably in the range of 0≤a≤0.7, and ideally in the range of 0≤a≤0.5. In formula (III), b is preferably in the range of 0.1≤b≤1.0, more preferably in the range of 0.3≤b≤1.0, and particularly in the range of 0.5≤b≤1.0. In formula (III), c is preferably in the range of 0≤c≤0.5, more preferably in the range of 0≤c≤0.3, and particularly in the range of 0≤c≤0.1. In formula (III), d is preferably in the range of 0≤d≤0.4, more preferably in the range of 0≤d≤0.2, and particularly in the range of 0≤d≤0.1. In formula (III), e is preferably in the range of 0≤e≤0.3, more preferably 0≤e≤0.2, and particularly in the range of 0≤e≤0.1.

The amount of the thiol groups contained in the organopolysiloxane containing at least 2 thiol groups in side-chains of the molecular chain in component (A-1) is 1% by mass or more, and preferably 1.2% by mass or more, and is, for example, no more than 30% by mass, and preferably no more than 25% by mass. The thiol group content (% by mass) can be calculated, for example, as the % by mass of thiol groups per molecular weight.

The amount of organopolysiloxane containing at least 2 thiol groups in side-chains of the molecular chain in component (A-1) is not particularly limited, but can be, based on the total mass of component (A-1), 0.1% by mass or more, 0.3% by mass or more, or 0.5% by mass or more, and can be no more than 90% by mass, no more than 85% by mass, and no more than 80% by mass.

Component (A-2) is an organopolysiloxane composition comprising a linear organopolysiloxane in which both ends of the molecular chain are capped with thiol groups, wherein the thiol group content is 1% by mass or more per molecule, and an organopolysiloxane containing at least 2 alkenyl groups in side-chains of the molecular chain and/or a resinous organopolysiloxane containing at least 2 alkenyl groups at the ends of the molecular chain.

The linear organopolysiloxane in which both ends of the molecular chain are blocked with thiol groups in component (A-2) is preferably represented by structural formula (IV): $R^4R^5_2SiO(R^5_2SiO)_pSiR^4R^5_2$; in formula (IV), $R^4$ is a thiol group, $R^5$ are each independently a monovalent hydrocarbon group other than an alkenyl group, and p is a numerical value representing a viscosity of 10 mPa or more. Here, 1 kind or combinations of 2 or more kinds of linear organopolysiloxanes in which both ends of the molecular chain are capped with thiol groups may be used.

In formula (IV), $R^4$ is a thiol group, for example, a thiol group represented by the structure —$(CH_2)_x$—SH (x is an integer of 1 to 30).

The amount of thiol groups per molecule contained in the linear organopolysiloxane in which both ends of the molecular chain are capped with thiol groups in component (A-2) is 1% by mass or more, and preferably 1.2% by mass or more, and is, for example, no more than 30% by mass, and preferably no more than 25% by mass. The thiol group content (% by mass) can be calculated, for example, as the % by mass of thiol groups per molecular weight.

Component (A-2) comprises an organopolysiloxane containing at least 2 alkenyl groups in side-chains of the molecular chain and/or a resinous organopolysiloxane containing at least 2 alkenyl groups at the ends of the molecular chain.

Examples of the structure of the organopolysiloxane containing at least 2 alkenyl groups in side-chains of the molecular chain in component (A-2) are linear, linear with some branching, branched, cyclic, and 3D network structures. One kind or combinations of 2 or more kinds of organopolysiloxanes containing at least 2 alkenyl groups in side-chains of the molecular chain in component (A-2) may be used. Component (A-2) preferably comprises a linear organopolysiloxane containing at least 2 thiol groups in side-chains of the molecular chain.

The organopolysiloxane containing at least 2 alkenyl groups in side-chains of the molecular chain in component (A-2) is preferably represented by average unit formula (V): $(R^5_3SiO_{1/2})_a(R^2_2SiO_{2/2})_b(R^2SiO_{3/2})_c(SiO_{4/2})_d(XO_{1/2})_e$. In formula (V), $R^5$ is the same as above, $R^2$ is a monovalent hydrocarbon group, but at least 2 of $R^2$ are alkenyl groups per molecule, X is a hydrogen atom or alkyl group, a, b, c, d, and e are $0 \leq a \leq 1.0$, $0 \leq b \leq 1.0$, $0 \leq c \leq 0.9$, $0 \leq d < 0.5$, and $0 \leq e < 0.4$, and a+b+c+d is a value that =1.0.

In formula (V), $R^2$ is a monovalent hydrocarbon group, including an alkenyl group; examples of alkenyl groups are the same as for $R^1$, and examples of monovalent hydrocarbon groups are the same as for $R^2$. Examples of thiol groups include the structure —$(CH_2)_x$—SH, where x is an integer of 1 to 30. Preferred examples of alkyl groups represented by X include $C_{1-3}$ alkyl groups, specifically, methyl, ethyl, and propyl groups.

In formula (V), a is preferably in the range of $0 \leq a \leq 0.9$, more preferably in the range of $0 \leq a \leq 0.7$, and ideally in the range of $0 \leq a \leq 0.5$. In formula (V), b is preferably in the range of $0.1 \leq b \leq 1.0$, more preferably in the range of $0.3 \leq b \leq 1.0$, and particularly in the range of $0.5 \leq b \leq 1.0$. In formula (V), c is preferably in the range of $0 \leq c \leq 0.5$, more preferably $0 \leq c \leq 0.3$, and particularly in the range of $0 \leq c \leq 0.1$. In formula (V), d is preferably in the range of $0 \leq d \leq 0.4$, more preferably in the range of $0 \leq d \leq 0.2$, and particularly in the range of $0 \leq d \leq 0.1$. In formula (V), e is preferably in the range of $0 \leq e \leq 0.3$, more preferably $0 \leq e \leq 0.2$, and particularly in the range of $0 \leq e \leq 0.1$.

The organopolysiloxane containing at least 2 alkenyl groups in side-chains of molecular chain in component (A-2) is preferably linear, and is therefore preferably represented by structural formula (VI): $R^5_3SiO(R^2_2SiO)_qSiR^5_3$. Here, in formula (VI), $R^2$ is the same as above, $R^3$ is the same as above but at least 2 of $R^2$ are alkenyl groups per molecule, and q is a viscosity in the range of 10 mPas or more.

Component (A-2) can contain a resinous organopolysiloxane containing at least 2 alkenyl groups at the ends of the molecular chain. In the present specification, resinous organopolysiloxanes refer to organopolysiloxanes that have a branched or network molecular structure. In one embodiment, the molecular structure of the resinous organopolysiloxane that can be included in component (A-2) contains at least one siloxane unit (T unit) represented by $RSiO_{3/2}$ and/or siloxane unit (Q unit) represented by $SiO_{4/2}$.

The resinous organopolysiloxane containing at least 2 alkenyl groups at the ends of the molecular chain in component (A-2) is preferably represented by average unit formula (VII): $(R^2_3SiO_{1/2})_a(R^2_2SiO_{2/2})_b(R^2SiO_{3/2})_c(SiO_{4/2})_d(XO_{1/2})_e$; in formula (VII), $R^2$ is a monovalent hydrocarbon group, but at least 2 of $R^2$ among $R^2$ in the unit $(R^2_3SiO_{1/2})$ are alkenyl groups per molecule, X is a hydrogen atom or an alkyl group, and a, b, c, d, and e are $0 \leq a \leq 1.0$, $0 \leq b \leq 1.0$, $0 \leq c < 0.9$, $0 \leq d \leq 1.0$, and $0 \leq e < 0.4$, a+b+c+d=1.0, and c+d>0). Preferably, in the resinous organopolysiloxane containing at least 2 alkenyl groups at the ends of the molecular chain in component (A-2), alkenyl groups are present only in unit M, and units D, T, and/or Q contain no alkenyl groups. Examples of alkenyl groups represented by $R^2$ are the same as for $R^1$, and examples of monovalent hydrocarbon groups are the same as for $R^2$. Preferred examples of alkyl groups represented by X include $C_{1-3}$ alkyl groups, specifically, methyl, ethyl, and propyl groups.

In component (A-2), the amount of alkenyl groups contained in the organopolysiloxane containing at least 2 alkenyl groups in side-chains of the molecular chain and the resinous organopolysiloxane containing at least 2 alkenyl groups at the ends of the molecular chain is not particularly limited, but alkenyl groups are, for example, preferably 0.01 to 50 mol %, 0.05 to 40 mol %, or 0.09 to 32 mol % of the total of functional groups R. The alkenyl group content can be determined by analysis such as Fourier transform infrared spectrophotometry (FT-IR) or nuclear magnetic resonance (NMR).

In component (A-2), the amount of the organopolysiloxane containing at least 2 alkenyl groups in side-chains of the molecular structure and/or the resinous organopolysiloxane containing at least 2 alkenyl groups at the ends of the molecular chain is not particularly limited, but can be 10% by mass or more, 20% by mass or more, 30% by mass or more, 40% by mass or more, or 50% by mass or more, and can be no more than 90% by mass, no more than 85% by mass, or no more than 80% by mass, based on the total mass of component (A-2).

Component (A-3) is an organopolysiloxane composition comprising an alkenyl group- and aryl group-containing organopolysiloxane and a multifunctional thiol compound.

Examples of the structure of the alkenyl group- and aryl group-containing organopolysiloxane in component (A-3) are linear, linear with some branching, branched, cyclic, and 3D network structures. One kind or combinations of 2 or more kinds of alkenyl group- and aryl group-containing organopolysiloxanes in component (A-3) may be used. Component (A-3) preferably comprises a linear alkenyl group- and aryl group-containing organopolysiloxane.

The alkenyl group- and aryl group-containing organopolysiloxane in component (A-3) is preferably represented by average unit formula (VII): $(R^2_3SiO_{1/2})_a(R^2_2SiO_{2/2})_b(R^2SiO_{3/2})_c(SiO_{4/2})_d(XO_{1/2})_e$. In formula (VII), $R^2$ is, in the same manner as above, a monovalent hydrocarbon group, including alkenyl groups, but at least 2 of $R^2$ are alkenyl groups, and at least 1 of $R^2$ is an aryl group, per molecule, X is a hydrogen atom or alkyl group, a, b, c, d, and e are 0≤a≤1.0, 0≤b≤1.0, 0≤c<0.9, 0≤d≤1.0, and 0≤e<0.4, a+b+c+d=1.0.

In formula (VII), $R^5$ is a monovalent hydrocarbon group, including an alkenyl group; examples of alkenyl groups are the same as for $R^1$, and examples of monovalent hydrocarbon groups are the same as for $R^2$ or $R^5$. Aryl groups are preferably phenyl groups. Preferred examples of alkyl groups represented by X include $C_{1-3}$ alkyl groups, specifically, methyl, ethyl, and propyl groups.

The aryl groups of the alkenyl group- and aryl group-containing organopolysiloxane in component (A-3) may be contained at either the ends of the molecular chain or in side-chains of the molecular chain, but are preferably contained in side-chains of the molecular chain, and more preferably only in side-chains of the molecular chain. The alkenyl groups of the alkenyl group- and aryl group-containing organopolysiloxane in component (A-3) may be contained at either the ends of the molecular chain or in side-chains of the molecular chain.

The alkenyl group- and aryl group-containing organopolysiloxane in component (A-3) is preferably linear, and is therefore preferably represented by structural formula (VIII): $R^7R^6{}_2SiO(R^8{}_2SiO)_rSiR^6{}_2R^7$. Here, in formula (VIII), $R^6$ through $R^8$ are each independently monovalent hydrocarbon groups, including alkenyl groups, but at least 2 of $R^6$ through $R^8$ are alkenyl groups and at least 1 is an aryl group per molecule, and r is a viscosity in the range of 10 mPas or more.

In formula (VIII), examples of alkenyl groups represented by $R^6$ through $R^8$ are the same as for $R^1$, and examples of monovalent hydrocarbon groups are the same as for $R^2$ or $R^5$. In a preferred embodiment, $R^7$ is an alkenyl group, $R^7$ are each independently monovalent hydrocarbon groups other than alkenyl groups, and $R^8$ is a monovalent hydrocarbon group other than an alkenyl group, but at least one $R^8$ is an aryl group, and preferably a phenyl group, per molecule.

In component (A-3), the amount of alkenyl groups contained in the alkenyl group- and aryl group-containing organopolysiloxane is not particularly limited, but alkenyl groups are, for example, preferably 0.01 to 50 mol %, 0.05 to 40 mol %, or 0.1 to 30 mol % of the total of functional groups R. The alkenyl group and aryl group content can be determined by analysis such as Fourier transform infrared spectrophotometry (FT-IR) or nuclear magnetic resonance (NMR).

The multifunctional thiol compound in component (A-3) is a compound containing 2 or more thiol groups per molecule. The multifunctional thiol compound may also contain tertiary thiol groups.

Examples of multifunctional thiol compounds include, but are not particularly limited to, bifunctional to hexafunctional primary or secondary thiol compounds. The multifunctional thiol compound is preferably at least a trifunctional thiol compound.

Examples of bifunctional secondary thiol compounds include 1,4-bis (3-mercaptobutyryloxy) butane, bis (1-mercaptoethyl) phthalate, bis (2-mercaptopropyl) phthalate, bis (3-mercaptobutyl) phthalate, ethylene glycol bis (3-mercaptobutyrate), propylene glycol bis (3-mercaptobutyrate), diethylene glycol bis (3-mercaptobutyrate), butanediol bis (3-mercaptobutyrate), octanediol bis (3-mercaptobutyrate), ethylene glycol bis (2-mercaptopropionate), propylene glycol bis (2-mercaptopropionate), diethylene glycol bis (2-mercaptopropionate), butanediol bis (2-mercaptopropionate), octanediol bis (2-mercaptopropionate), ethylene glycol bis (2-mercaptopropionate), propylene glycol bis (2-mercaptopropionate), diethylene glycol bis (2-mercaptopropionate), butanediol bis (2-mercaptopropionate), octanediol bis (2-mercaptopropionate), ethylene glycol bis (4-mercaptovalerate), propylene glycol bis (4-mercaptoisovalerate), diethylene glycol bis (4-mercaptovalerate), butanediol bis (4-mercaptovalerate), octanediol bis (4-mercaptovalerate), ethylene glycol bis (3-mercaptovalerate), propylene glycol bis (3-mercaptovalerate), diethylene glycol bis (3-mercaptovalerate), butanediol bis (3-mercaptovalerate), and octanediol bis (3-mercaptovalerate).

Examples of trifunctional secondary thiol compounds include trimethylolpropane tris (3-mercaptobutyrate), trimethylolpropane tris (2-mercaptopropionate), trimethylolpropane tris (2-mercaptopropionate), trimethylolpropane tris (4-mercaptovalerate), trimethylolpropane tris (3-mercaptovalerate), 1,3,5-tris (3-mercaptobutyloxyethyl)-1,3,5-triazine-2,4,6 (1H,3H,5H)-trione.

Examples of tetrafunctional secondary thiol compounds include dipentaerythritol hexakis (3-mercaptobutyrate), pentaerythritol tetrakis (2-mercaptopropionate), pentaerythritol tetrakis (3-mercapto-2-propionate), pentaerythritol tetrakis (2-mercaptoisobutyrate), pentaerythritol tetrakis (4-mercaptovalerate), pentaerythritol and tetrakis (3-mercaptovalerate).

Examples of hexafunctional secondary thiol compounds include dipentaerythritol hexakis (3-mercaptobutyrate), dipentaerythritol hexakis (2-mercaptopropionate), dipentaerythritol hexakis (2-mercaptoisobutyrate), dipentaerythritol hexakis (4-mercaptovalerate), and dipentaerythritol hexakis (3-mercaptovalerate).

An example of a bifunctional primary thiol compound is 2,2'-(ethylenedioxy)diethanethiol.

An example of a trifunctional primary thiol compound is trimethylolpropane tris (3-mercaptopropionate).

An example of a tetrafunctional primary thiol compound is pentaerythritol tetrakis (3-mercaptopropionate).

In preferred embodiments, the multifunctional thiol compound contains no hydroxyl groups.

When component (A-3) contains only a bifunctional thiol compound as the multifunctional thiol compound, an alkenyl group-containing resinous organopolysiloxane is included as an organopolysiloxane component in the interests of curability. Examples of such alkenyl group-containing resinous organopolysiloxanes include the same as for the "alkenyl group-containing resinous organopolysiloxanes" noted in the "additional components" section below.

The molecular weight of the multifunctional thiol compound is not particularly limited but can be, for example, 100 or more, 120 or more, or 150 or more, and no more than 10,000, no more than 5,000, no more than 4,000, no more than 3,000, or no more than 2,000.

The amount of the multifunctional thiol compound in component (A-3) is not particularly limited, but can be, based on the total mass of component (A-3), 0.1% by mass or more, 0.3% by mass or more, or 0.5% by mass or more, and can be no more than 90% by mass, no more than 70% by mass, or no more than 50% by mass.

Additional Components

The organopolysiloxane composition of component (A) may further contain, in addition to the above components, an alkenyl group-containing resinous organopolysiloxane. For example, the organopolysiloxane composition of component (A-1) and/or (A-3) may further contain, in addition to the above components, an alkenyl group-containing resinous organopolysiloxane.

In one embodiment of the present disclosure, the resinous organopolysiloxane that can be included in component (A) is preferably represented by average unit formula (IX): $(R^2_3SiO_{1/2})_a(R^2_2SiO_{2/2})_b(R^2SiO_{3/2})_c(SiO_{4/2})_d(XO_{1/2})_e$; in formula (IX), $R^2$ is a monovalent hydrocarbon group, but at least 2 of $R^2$ are alkenyl groups per molecule, X is a hydrogen atom or an alkyl group, and a, b, c, d, and e are $0 \le a \le 1.0$, $0 \le b \le 1.0$, $0 \le c < 0.9$, $0 \le d \le 1.0$, and $0 \le e < 0.4$, $a+b+c+d=1.0$, and $c+d>0$. Examples of alkenyl groups represented by $R^2$ are the same as for $R^1$, and examples of monovalent hydrocarbon groups are the same as for $R^2$. Preferred examples of alkyl groups represented by X include $C_{1-3}$ alkyl groups, specifically, methyl, ethyl, and propyl groups.

In average unit formula (IX), a is preferably in the range of $0 \le a \le 0.9$, more preferably in the range of $0 \le a \le 0.8$, and particularly in the range of $0 \le a \le 0.7$. In average unit formula (IX), b is preferably in the range of $0 \le b \le 0.9$, more preferably in the range of $0 \le b \le 0.7$, and particularly in the range of $0 \le b \le 0.5$. In average unit formula (IX), c is preferably in the range of $0 \le c \le 0.9$, more preferably in the range of $0 \le c \le 0.85$, and particularly in the range of $0 \le c \le 0.8$. In average unit formula (IX), d is preferably in the range of $0 \le d \le 0.9$, more preferably in the range of $0 \le d \le 0.8$, even more preferably in the range of $0 \le d \le 0.7$. In average unit formula (IX), e is preferably in the range of $0 \le e \le 0.3$, more preferably in the range of $0 \le e \le 0.2$, and particularly in the range of $0 \le e \le 0.1$.

The alkenyl group content in the resinous organopolysiloxane that can be included in component (A) (mol % of alkenyl groups in all silicon atom-bonded functional groups of the resinous organopolysiloxane) can be designed as desired, but should be 0.5 mol % or more, preferably 1 mol % or more, more preferably 1 mol % or more, and even more preferably 2 mol % or more, and can be 40 mol % or less, preferably 35 mol % or less, more preferably 30 mol % or less, and preferentially 25 mol % or less. The alkenyl group content can be determined by analysis such as Fourier transform infrared spectrophotometry (FT-IR) or nuclear magnetic resonance (NMR).

The content of the resinous organopolysiloxane that can be included in component (A) is not particularly limited, but can be 1% by mass or more, preferably 3% by mass or more, and more preferably 5% by mass or more, based on the total mass of organopolysiloxane composition (A). The content of the resinous organopolysiloxane that can be included in component (A) can be 70% by mass or less, preferably 60% by mass or less, and more preferably 50% by mass or less, based on the total mass of organopolysiloxane composition (A).

The ratio between the thiol groups (—SH groups) and alkenyl groups (SH/Vi ratio) in the organopolysiloxane composition (A) is not particularly limited, but is preferably 0.6 to 5 mols, and preferably 0.7 to 3 mols thiol groups per mol alkenyl group. The amount of alkenyl groups can be calculated based on vinyl groups (Vi groups).

The ratio between the thiol groups and alkenyl groups (SH/Vi ratio) included in the organopolysiloxane composition of the present disclosure is 0.6 or more. Here, the amount of alkenyl groups can be calculated based on vinyl groups (Vi groups). The ratio between the thiol groups and alkenyl groups (SH/Vi ratio) included in the organopolysiloxane composition of the present disclosure is 0.7 or more, and more preferably 0.8 or more.

(B) Silicone-Miscible Photo-Initiator

The UV curable silicone composition of the present disclosure comprises a silicone-miscible photo-initiator as component (B). Here, "miscible" refers to the property of the photo-initiator being completely mixed with the organopolysiloxane composition of component (A). For example, as used in the present specification, "silicone-miscible" means the property of 1 g/100 mL or more being dissolved in silicone oil.

The silicone-miscible photo-initiator of component (B) comprises the following:
 (B-1) an alpha-hydroxyacetophenone,
 (B-2) a combination of an alpha-hydroxyacetophenone and an alpha-aminoalkylphenone, or
 (B-3) a combination of an alpha-hydroxyacetophenone and a mono-acylphosphine oxide.

The components are described in detail below.

Examples of alpha-hydroxyacetophenone (B-1) include 2-hydroxy-2-methyl-1-phenyl-1-propanone (by IGM Resins B. V.; brand name: Omnirad 1173); 2-hydroxy-4'(2-hydroxyethoxy)-2-methylpropiophenone (by IGM Resins B. V.; brand name Omnirad 2959), oligo-[2-hydroxy-2-methyl-1-[4-(1-methylvinyl)-phenyl]-propanone], 1,1'-(methylene-di-4,1-phenylene) bis [2-hydroxy-2-methyl-1-propanone] (by IGM Resins B. V.; brand name: Omnirad 127D), and 1-hydroxycyclohexyl-phenylketone (by IGM Resins B. V.; brand name: Omnirad 184).

The photo-initiator (B-1) may furthermore contain a compound having an acetophenone structure other than alpha-hydroxyacetophenone in addition to the alpha-hydroxyacetophenone. Examples of compounds having such an acetophenone structure include, but are not particularly limited to, 4-phenoxydichloroacetophenone, 4-t-butyldichloroacetophenone, 4-t-butyltrichloroacetophenone, and diethoxyacetophenone.

In a particularly preferred embodiment, the alpha-hydroxyacetophenone-containing photo-initiator (B-1) contains only alpha-hydroxyacetophenone and either contains no other photo-initiator or contains another photo-initiator in an amount 10% by mass or less, 5% by mass or less, or 3% by mass or less based on the total mass of component (B).

Examples of alpha-aminoalkylphenones in (B-2) combinations of an alpha-hydroxyacetophenone and an alpha-aminoalkylphenone include 2-methyl-1-[4-(methylthio)phenyl]-2-(4-morpholinyl)-propan-1-one (by IGM Resins B. V.; brand name Omnirad 907), 2-dimethylamino-2-(4-methylbenzyl)-1-(4-morpholin-4-yl-phenyl)-butan-1-one (by IGM Resins B. V.; brand name: Omnirad 379EG), 2-benzyl-2-dimethylamino-1-(3,4-dimethoxy-phenyl)-butan-1-one, 2-benzyl-2-dimethyl amino-1-(4-morpholin-4-yl-phenyl)-butan-1-one, 2-(dimethylamino)-1-(4-morpholinophenyl)-2-benzyl-1-butanone (by IGM Resins B. V.; brand name Omnirad 369), and 2-methyl-1-(4-methylsulfanyl-phenyl)-2-morpholin-4-yl-propan-1-one.

The weight ratio between the alpha-hydroxyacetophenone and alpha-aminoalkylphenone in (B-2) combinations of an alpha-hydroxyacetophenone and an alpha-aminoalkylphenone is not particularly limited, but the mass ratio of the alpha-hydroxyacetophenone to the alpha-aminoalkylphenone may be, for example, 0.1 to 100, preferably 0.5 to 50, and more preferably 1 to 20.

In a particularly preferred embodiment, a photo-initiator comprising (B-2) a combination of an alpha-hydroxyacetophenone and an alpha-aminoalkylphenone will consist of only an alpha-hydroxyacetophenone and an alpha-aminoalkylphenone, and will either contain no other photo-initiator or contain another photo-initiator in an amount 10% by mass or less, 5% by mass or less, or 1% by mass or less based on the total mass of component (B).

Examples of mono-acylphosphine oxides in (B-3) combinations of an alpha-hydroxyacetophenone and a mono-acylphosphine oxide include (2,4,6-trimethylbenzoyl)-diphenyl-phosphine oxide (by IGM Resins B. V.; brand name: Omnirad TPO-H) and phenyl-(2,4,6-trimethylbenzoyl)-phosphinate ethyl ester (by IGM Resins B. V.; brand name: Omnirad TPO-L).

The weight ratio between the alpha-hydroxyacetophenone and mono-acylphosphine oxide in (B-3) combinations of an alpha-hydroxyacetophenone and a mono-acylphosphine oxide is not particularly limited, but the mass ratio of the alpha-hydroxyacetophenone to the mono-acylphosphine oxide may be, for example, 0.1 to 100, preferably 0.5 to 50, and more preferably 0.8 to 20.

In a particularly preferred embodiment, the photo-initiator comprising (B-3) a combination of an alpha-hydroxyacetophenone and a mono-acylphosphine oxide will consist of only an alpha-hydroxyacetophenone and a mono-acylphosphine oxide, and will either contain no other photo-initiator or contain another photo-initiator in an amount 10% by mass or less, 5% by mass or less, or 1% by mass or less based on the total mass of component (B).

In the present specification, examples of "other photo-initiators" include, but are not limited to, photo-initiators other than those listed as components of (B-1) through (B-3), such as bisacylphosphine oxides, trisacylphosphine oxides, phenyl glyoxalates, thioxanthone, benzoin ethers, and oxime ester. The photo-initiator (B) of the present disclosure need not include some of these other photo-initiators. The photo-initiator (B) of the present disclosure may either include no photo-initiator other than an alpha-hydroxyacetophenone, alpha-aminoalkylphenone, or mono-acylphosphine oxide, or may contain them in an amount 10% by mass or less, 5% by mass or less, or 1% by mass or less, based on the total mass of component (B).

The content of the photo-initiator (B) is not particularly limited, but is preferably, based on the total mass of the UV curable silicone composition, 0.001% by mass or more, more preferably 0.01% by mass or more, even more preferably 0.1% by mass or more, preferentially 1% by mass or more, and in particular preferably 2% by mass or more. In a preferred embodiment, the content of the photo-initiator (B) is 10% by mass or less, more preferably 5% by mass or less, and even more preferably 3% by mass or less, based on the total mass of the UV curable silicone composition.

Optional components can be blended into the UV curable silicone composition of the present disclosure, provided that the object of the present disclosure is not thereby compromised. Examples of optional components include amino group-containing siloxane compounds, glycidyl (epoxy) group-containing siloxane compounds, ionic liquids, acetylene compounds, organic phosphorus compounds, vinyl group-containing siloxane compounds, ultraviolet absorbers, sensitizers, photostabilizers, free radical scavengers, polymerization inhibitors, antioxidants, ultraviolet absorbers, antifoaming agents, leveling agents, inorganic fillers, surfactants, coupling agents, tackifiers, mold release agents, metal soaps, agents that impart heat resistance, agents that impart cold resistance, thermally conductive fillers, agents that impart flame retardance, agents that impart thixotropic properties, fluorescent substances, and solvents.

Examples of polymerization inhibitors (also referred to as a free radical scavengers) that can be used include, but are not particularly limited to, alkoxy-titanium or the following products: Genorad (registered trademark) 16, Genorad (registered trademark) 24 (the above are by Rahn AG); Sumilizer (registered trademark) GA-80, Sumilizer (registered trademark) GM, Sumilizer (registered trademark) GS (the above are by Sumitomo Chemical); Irgastab (registered trademark) UV10, Irgastab (registered trademark) UV22, Tinuvin (registered trademark) 460, Tinuvin (registered trademark) CGS20 (the above are by Ciba Specialty Chemicals); Floorstab (registered trademark) UV (UV-1, UV-2, UV-5, UV-8) (by Kromachem); and Additor (registered trademark) S (S100, S110, S120, S130) (by Cytec Surface Specialties).

The UV curable silicone composition of the present disclosure can be prepared by mixing the components. The method of mixing the components may be a conventionally known method, and is not particularly limited, and a uniform mixture is usually obtained by simple mixing. When solid components such as inorganic filler are included as an optional component, it is preferable to use a mixing device for the mixing. There are no particular limitations regarding this mixing device, and examples include single- and twin-screw continuous mixers, double roller mixers, Ross mixers, Hobart mixers, dental mixers, planetary mixers, kneader mixers, Henschel mixers, and the like.

Use in the Form of Encapsulant and Sheet Film

The present disclosure also relates to an encapsulant or sheet film obtained by curing the UV curable silicone composition of the present disclosure. The sheet film of the present disclosure is preferably used as an encapsulant layer or an adhesive sheet film for mass transfer, and is obtained by curing the UV curable silicone composition of the present disclosure, resulting in exceptional dimensional stability and minimal warping. Preferred examples of electronic devices for which the sheet film of the present disclosure may used include, but are not particularly limited to, optical semiconductor devices, such as light emitting diodes (LED), semiconductor lasers, photodiodes, phototransistors, solid-state imaging, and light emitters and light receivers photocouplers.

The encapsulant or sheet film of the present disclosure can be obtained, for example, by coating a base material in the form of a film, tape, or sheet with the UV curable silicone composition of the present disclosure, which is then cured by irradiation with ultraviolet rays to form a cured film on the surface of the base material. The thickness of the cured film is not particularly limited but preferably ranges from 1 µm to 10 mm or from 5 µm to 5 mm.

In the present specification, the term "ultraviolet" refers to electromagnetic radiation having a wavelength of about 10 nm to about 400 nm, and the wavelength for ultraviolet curing can be selected from, for example, UVA and UVB wavelength bands at 280 nm to 400 nm. Examples of devices that generate ultraviolet rays include high-pressure mercury lamps, medium-pressure mercury lamps, and ultraviolet LEDs. The level of ultraviolet ray exposure is not particularly limited but, at 365 nm, should be preferably 1 to 1,000 mW/cm$^2$, more preferably 5 to 500 mW/cm$^2$, and even more preferably 10 to 200 mW/cm$^2$.

EXAMPLES

The UV curable silicone composition of the present disclosure is described in greater detail by means of the following examples and comparative examples.

The starting material components shown below were used in the following examples and comparative examples. Below, Me represents a methyl group, Vi represents a vinyl group, and Ph represents a phenyl group.

Component a-1-1: Linear organopolysiloxane in which both ends of the molecular chain are capped with vinyl groups, which is represented by general formula ViMe$_2$SiO(Me$_2$ SiO)$_{310}$SiMe$_2$ Vi Component a-1-2: Linear organopolysiloxane in which both ends of the molecular chain are capped with vinyl groups, which is represented by general formula $ViMe_2SiO(Me_2SiO)_{150}SiMe_2Vi$ Component a-1-3: Linear organopolysiloxane in which both ends of the molecular chain are capped with vinyl groups, which is represented by general formula $ViMe_2SiO(Me_2SiO)_{530}SiMe_2Vi$ Component a-1-4: Linear organopolysiloxane in which both ends of the molecular chain are capped with vinyl groups, which is represented by general formula $ViMe_2SiO(Me_2SiO)_{770}SiMe_2Vi$ Component a-1-5: Linear organopolysiloxane in which both ends of the molecular chain are capped with vinyl groups, which is represented by general formula $ViMe_2SiO(Me_2SiO)_nSiMe_2Vi$, wherein the viscosity is 60 mPas, and the vinyl group content is 1.5 mol %

Component a-2-1: Linear organopolysiloxane having a vinyl group in a side-chain of the molecular chain, which is represented by unit formula $Me_3SiO(MeViSiO)_n(Me_2SiO)_mSiMe_3$, wherein the viscosity is 35000 mPas, and the alkenyl group content is 0.5 wt %

Component a-2-2: Linear organopolysiloxane having a vinyl group in a side-chain of the molecular chain, which is represented by unit formula $Me_3SiO(MeViSiO)_n(Me_2SiO)_mSiMe_3$, wherein the viscosity is 8000 mPas, and the vinyl group content is 0.3 wt %

Component a-2-3: Linear organopolysiloxane having vinyl groups at the ends of, and in a side-chain of, the molecular chain, which is represented by unit formula $ViMe_2SiO(MeViSiO)_n(Me_2SiO)_mSiMe_2Vi$, wherein the viscosity is 370 cSt, and the vinyl group content is 1.1 wt %

Component a-2-4: 1,3,5,7-tetramethyl-1,3,5,7-tetravinyl-cyclotetrasiloxane

Component a-2-5: Branched alkenyl group-containing organopolysiloxane represented by $(ViMe_2SiO)_3(PhSiO_{3/2})$ Component a-3-1: Organopolysiloxane containing a thiol group in a side-chain of the molecular chain, which is represented by unit formula $(Me_2SiO)_n(HSMeSiO)_m$, wherein the viscosity is 100 mPas, and the thiol group content is 3.6 wt %

Component a-3-2: Organopolysiloxane containing a thiol group in a side-chain of the molecular chain, which is represented by unit formula $(Me_2SiO)_n(HSMeSiO)_m$, wherein the viscosity is 150 mPas, and the thiol group content is 4.6 wt %

Component a-3-3: Organopolysiloxane containing a thiol group in a side-chain of the molecular chain, which is represented by unit formula $(Me_2SiO)_n(HSMeSiO)_m$, wherein the viscosity is 150 mPas, and the thiol group content is 1.5 wt %

Component a-3-4: Organopolysiloxane containing a thiol group in a side-chain of the molecular chain, which is represented by unit formula $(HSMeSiO)_n$, wherein the viscosity is 100 mPas, and the thiol group content is 23 wt %

Component a-3-5: Organopolysiloxane containing a thiol group in a side-chain of the molecular chain, which is represented by unit formula $(Me_2SiO)_n(HSMeSiO)_m$, wherein the viscosity is 150 mPas, and the thiol group content is 0.8 wt %

Component a-4-1: Linear organopolysiloxane in which both ends of the molecular chain are capped with thiol groups, which is represented by unit formula $HSMe_2SiO(Me_2SiO)_nSiMe_2SH$, wherein the viscosity is 90 mPas, and the thiol group content is 1.4 wt %

Component a-4-2: Linear organopolysiloxane in which both ends of the molecular chain are capped with thiol groups, which is represented by unit formula $HSMe_2SiO(Me_2SiO)_nSiMe_2SH$, wherein the viscosity is 55 mPas, and the thiol group content is 2.0 wt %

Component a-5-1: Phenyl group-containing linear organopolysiloxane in which both ends of the molecular chain are capped with vinyl groups, which is represented by general formula $ViMe_2SiO(PhMeSiO)_{20}SiMe_2Vi$ Component a-5-2: Phenyl group-containing linear organopolysiloxane in which both ends of the molecular chain are capped with vinyl groups, which is represented by general formula $ViMe_2SiO(Me_2SiO)_{200}(Ph_2SiO)_{50}SiMe_2Vi$ Component a-5-3: Phenyl group-containing linear organopolysiloxane in which both ends of the molecular chain are capped with vinyl groups, which is represented by general formula $ViMe_2SiO(Me_2SiO)_{60}(Ph_2SiO)_{30}SiMe_2Vi$ Component a-6-1: Resinous vinyl group-containing organopolysiloxane represented by unit formula $(ViMe_2SiO_{1/2})_4(Me_3SiO_{1/2})_{40}(SiO_{4/2})_{56}$ Component a-6-2: Resinous vinyl group-containing organopolysiloxane represented by unit formula $(ViMe_2SiO_{1/2})_1(Me_3SiO_{1/2})_{34}(SiO_{4/2})_{55}$ Component a-6-3: Resinous vinyl group-containing organopolysiloxane represented by unit formula $(ViMe_2SiO_{1/2})_{15}(Me_3SiO_{1/2})_{45}(SiO_{4/2})_{40}$ Component a-6-4: Resinous vinyl group-containing organopolysiloxane represented by unit formula $(ViMe_2SiO_{1/2})_4Me_3SiO_{1/2})_{40}(SiO_{4/2})_{50}$ Component a-6-5: Resinous vinyl group- and phenyl group-containing organopolysiloxane represented by unit formula $(ViMe_2SiO_{1/2})_{25}(PhSiO_{3/2})_{75}$ Component a-6-6: Resinous vinyl group- and phenyl group-containing organopolysiloxane represented by unit formula $(ViMe_2SiO_{1/2})_{15}(Me_2SiO_{2/2})_{35}(PhSiO_{3/2})_{50}$ Component a-6-7: Resinous vinyl group- and phenyl group-containing organopolysiloxane represented by unit formula $(ViMeSiO_{2/2})_{25}(Ph_2SiO_{2/2})_{35}(PhSiO_{3/2})_{45}$ Component a-7-1: Trifunctional secondary thiol compound represented by compositional formula $C_{18}H_{32}O_6S_3$ trimethylolpropane tris (3-mercaptobutyrate)

Component a-7-2: Bifunctional primary thiol compound represented by compositional formula $HSCH_2CH_2OCH_2CH_2OCH_2CH_2SH$ 2,2'-(ethylenedioxy) diethanethiol.

Component a-7-3: Bifunctional primary thiol compound represented by compositional formula $(HSCH_2COOCH_2)_2$ ethylene glycol bismercaptoacetate Component a-7-4: Trifunctional primary thiol compound represented by composition formula $(HSCH_2CH_2CO_2CH_2)_3CC_2H_5$ trimethylolpropane tris (3-mercaptopropionate)

Component a-7-5: Tetrafunctional primary thiol compound represented by composition formula $(HSCH_2CH_2COOCH_2)_4C$ pentaerythritol tetrakis (3-mercaptopropionate)

Component a-7-6: Bifunctional secondary thiol compound represented by compositional formula $C_{12}H_{22}O_4S_2$ 1,4-bis (3-mercaptobutyryloxy) butane Component a-7-7: Trifunctional primary thiol compound represented by compositional formula $C_{18}H_{27}N_3O_9S_3$ tris [2-(3-mercaptopionyloxy)ethyl] isocyanurate Component a-7-8: Trifunctional secondary thiol compound represented by compositional formula $C_{21}H_{33}O_9N_3S_3$ 1,3,5-tris (2-(3-sulfanylbutanoyloxy) ethyl)-1,3,5-triazinane-2,4,6-trione Component a-7-9: Tetrafunctional secondary thiol compound represented by compositional formula $C_{21}H_{36}O_8S_4$ pentaerythritol tetrakis (3-mercaptobutyrate)

Component b-1: 2-hydroxy-2-methyl-1-phenyl-1-propanone (by IGM Resins B. V.; brand name: Omnirad 1173)

Component b-2: 1,1'-(methylene-di-4,1-phenylene) bis [2-hydroxy-2-methyl-1-propanone](by IGM Resins B. V.; brand name: Omnirad 127D)

Component b-3: 1-hydroxycyclohexyl-phenylketone (by IGM Resins B. V.; brand name: Omnirad 184)

Component b-4: 2-methyl-1-[4-(methylthio)phenyl]-2-(4-morpholinyl)-propan-1-one (by IGM Resins B. V.; brand name Omnirad 907)

Component b-5: 2-dimethyl amino-2-(4-methylbenzyl)-1-(4-morpholin-4-yl-phenyl)-butan-1-one (by IGM Resins B. V.; brand name: Omnirad 379EG)

Component b-6: Phenyl-(2,4,6-trimethylbenzoyl)-phosphinate ethyl ester (by IGM Resins B. V.; brand name: Omnirad TPO-L).

Component b-7: 2,4,6-trimethylbenzoyl)-diphenyl-phosphine oxide (by IGM Resins B. V.; brand name: Omnirad TPO-H).

Component b-8: 2-benzyl-2-(dimethylamino)-4'-morpholinobutyrophenone (by IGM Resins B. V.; brand name Omnirad 369)

Component b'-1: Methyl benzoylformate (by IGM Resins B. V.; brand name: Omnirad MBF)

Component b'-2: 2,4-diethylthioxanthen-9-one (DETX)

Component b'-3: phenyl bis (2,4,6-trimethylbenzoyl)-phosphine oxide (by IGM Resins B. V.; brand name: Omnirad 819)

Component b'-4: Ethyl 4-(dimethylamino)benzoate (by IGM Resins B. V.; brand name: Omnirad EDB)

Component b'-5: 1,1'-(oxybis(4,1-phenylene))bis (2-hydroxy-2-methylpropan-1-one (by LEHVOSS; brand name: Esacure KIP160)

Component b'-6: 1-[4-(4-benzoylphenylsulfanyl)phenyl]-2-methyl-2-(4-methylphenylsulfonyl)propan-1-one (by LEHVOSS; brand name: Esacure E1001M)

Component b'-7: Thioxanthone-based photo-initiator (by LEHVOSS; brand name: Esacure One)

Component b'-8: (4,4'-bis(diethylamino)benzophenone (by IGM Resins B. V.; brand name: Omnirad EMK)

Component b'-9: Polybutylene glycol bis(4-benzoylphenoxy)acetate (by IGM Resins B. V.; brand name: Omnipol BP)

Component b'-10: 2,2-dimethoxy-2-phenylacetophenone (by IGM Resins B.I. V.; brand name Omnirad 651)

Component c: Photo-sensitizer Anthracure (registered trademark) UVS-1331 (by Kawasaki Kasei Chemicals Ltd.)

Examples 1-53 and Comparative Examples 1-34

UV silicone compositions were prepared by mixing the respective components in the proportions (% by mass) shown in Tables 1 through 9. The "SH/Vi ratio" in the tables indicates the molar ratio between the thiol groups and vinyl groups in the organopolysiloxane components.

Evaluation

The curability of the compositions in the examples and comparative examples was determined as shown below, and the results are shown in Tables 1 through 9.

The resulting compositions were applied with the use of a blade coater to a thickness of 10 μm on PET films. Films were obtained by curing the compositions via ultraviolet light irradiation as described in (1) through (3) below using a metal halide lamp.

(1) Wavelength 254 nm; 5.4 mJ/cm$^2$ (irradiation for 1 min)
(2) Wavelength 365 nm; 12.3 J/cm$^2$ (irradiation for 1 min)
(3) Wavelength 405 nm; 69.3 J/cm$^2$ (irradiation for 1 min)

The resulting films were cut to a size of 5×5 cm$^2$, the resulting cut samples were dipped in 50 mL of toluene, washed for 30 minutes, and then dried for 90 minutes at 120° C., and the residual weight was determined. The residual weight values that were determined are shown in Tables 1 through 5 below. Compositions having a residual weight of 50% or more can be assessed as having exceptional curability. "Not mixed" indicates compositions in which components (A) and (B) could not be mixed, and "not cured" indicates compositions that could not be cured.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Component | | | | | | | | | | |
| a-1-1 | 90.7 | 90.7 | 90.7 | 90.7 | 90.7 | 90.7 | 90.7 | 90.7 | 42 | 28.8 |
| a-2-1 | — | — | — | — | — | — | — | — | — | — |
| a-3-1 | 8.3 | 8.3 | 8.3 | 8.3 | 8.3 | 8.3 | 8.3 | 8.3 | 24 | 46 |
| a-6-1 | — | — | — | — | — | — | — | — | 33 | 22.7 |
| b-1 | 1 | 0.875 | 0.67 | 0.66 | 0.91 | 0.5 | 0.8 | 0.91 | 1 | 2.5 |
| b-2 | — | 0.125 | — | — | — | — | — | — | — | — |
| b-3 | — | — | 0.33 | — | — | — | — | — | — | — |
| b-4 | — | — | — | 0.33 | — | — | — | — | — | — |
| b-5 | — | — | — | — | 0.09 | — | — | — | — | — |

TABLE 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| b-6 | — | — | — | — | — | 0.5 | — | — | — | — |
| b-7 | — | — | — | — | — | — | 0.2 | — | — | — |
| b-8 | — | — | — | — | — | — | — | 0.09 | — | — |
| Total | 100 | 100 | 100 | 100 | 100 | 100 | 100 | 100 | 100 | 100 |
| SH/Vi ratio | 1.2 | 1.2 | 1.2 | 1.2 | 1.2 | 1.2 | 1.2 | 1.2 | 0.9 | 2.54 |
| Evaluation |  |  |  |  |  |  |  |  |  |  |
| Residual weight (%) | 50 | 51 | 55 | 55 | 60 | 55 | 66 | 60 | 60 | 80 |

TABLE 2

|  | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|
| Component |  |  |  |  |  |  |  |  |  |  |  |
| a-1-1 | — | — | 46.5 | — | — | — | 8.4 | 23.2 | 90.7 | 42 | 81.5 |
| a-1-2 | 84 | — | — | — | — | — | — | — | — | — | — |
| a-1-3 | — | 93.8 | — | — | 41.3 | — | — | — | — | — | — |
| a-1-4 | — | — | 46.5 | — | — | 30 | 66 | 20 | — | — | — |
| a-1-5 | — | — | — | 60 | — | — | — | — | — | — | — |
| a-3-1 | 15 | 5.2 | 6.0 | 39 | 33.4 | 43 | — | — | — | — | — |
| a-3-2 | — | — | — | — | — | — | — | — | 8.3 | 24 | — |
| a-3-3 | — | — | — | — | — | — | — | — | — | — | 17.5 |
| a-4-1 | — | — | — | — | — | — | 18 | 37.5 | — | — | — |
| a-6-1 | — | — | — | — | — | — | 6.6 | 18.3 | — | 33 | — |
| a-6-2 | — | — | — | — | 24.3 | — | — | — | — | — | — |
| a-6-3 | — | — | — | — | — | 26 | — | — | — | — | — |
| b-1 | 1 | 1 | 1 | 1 | 1 | 1 | 1 | 1 | 1 | 1 | 1 |
| Total | 100 | 100 | 100 | 100 | 100 | 100 | 100 | 100 | 100 | 100 | 100 |
| SH/Vi ratio | 1.2 | 1.2 | 1.2 | 1.2 | 0.9 | 0.9 | 1.0 | 1.0 | 1.5 | 1.1 | 1.2 |
| Evaluation |  |  |  |  |  |  |  |  |  |  |  |
| Residual weight (%) | 55 | 50 | 50 | 83 | 75 | 55 | 50 | 54 | 90 | 95 | 50 |

TABLE 3

|  | Example 22 | Example 23 | Example 24 | Example 25 | Example 26 | Example 27 | Example 28 | Example 29 | Example 30 | Example 31 |
|---|---|---|---|---|---|---|---|---|---|---|
| Component |  |  |  |  |  |  |  |  |  |  |
| a-1-1 | 97.6 | — | — | — | — | — | — | — | — | — |
| a-1-2 | — | — | — | — | — | — | — | — | 13.1 | — |
| a-1-3 | — | 41.4 | — | — | — | — | — | 14.6 | — | — |
| a-1-5 | — | — | — | — | — | — | 10.2 | — | — | — |
| a-3-1 | — | — | — | — | — | — | 49 | 44 | 45.5 | — |
| a-3-3 | — | 30 | — | — | — | — | — | — | — | — |
| a-3-4 | 1.4 | 3.2 | — | — | — | — | — | — | — | — |
| a-5-1 | — | — | — | — | — | — | — | — | — | 90.5 |
| a-5-2 | — | — | 97.6 | — | — | 71 | — | — | — | — |
| a-5-3 | — | — | — | 96 | 94.9 | — | — | — | — | — |
| a-6-2 | — | 24.3 | — | — | — | — | — | — | — | — |
| a-6-3 | — | — | — | — | — | 19 | — | — | — | — |
| a-6-4 | — | — | — | — | 1 | 39.8 | 40.4 | 40.4 | — | — |
| a-7-1 | — | — | 1.4 | — | — | 8 | — | — | — | — |
| a-7-4 | — | — | — | — | — | — | — | — | — | 8.5 |

TABLE 3-continued

|  | Example 22 | Example 23 | Example 24 | Example 25 | Example 26 | Example 27 | Example 28 | Example 29 | Example 30 | Example 31 |
|---|---|---|---|---|---|---|---|---|---|---|
| a-7-8 | — | — | — | — | 4.1 | — | — | — | — | — |
| a-7-9 | — | — | — | 3 | — | — | — | — | — | — |
| b-1 | 1 | 1 | 1 | 1 | 1 | 1 | 1 | 1 | 1 | 1 |
| Total | 100 | 100 | 100 | 100 | 100 | 100 | 100 | 100 | 100 | 100 |
| SH/Vi ratio | 1.2 | 1.2 | 1.2 | 1.2 | 1.2 | 1.3 | 1.0 | 0.9 | 0.9 | 1.2 |
| Evaluation |  |  |  |  |  |  |  |  |  |  |
| Residual weight (%) | 50 | 77 | 60 | 65 | 60 | 61 | 72 | 72 | 70 | 60 |

TABLE 4

|  | Example 32 | Example 33 | Example 34 | Example 35 | Example 36 | Example 37 | Example 38 | Example 39 | Example 40 | Example 41 |
|---|---|---|---|---|---|---|---|---|---|---|
| Component |  |  |  |  |  |  |  |  |  |  |
| a-1-1 | — | — | — | — | 29.7 | 26.3 | — | — | — | — |
| a-1-4 | — | — | — | — | — | 10 | — | — | — | — |
| a-2-4 | — | 20 | — | — | — | — | — | — | — | — |
| a-2-5 | — | — | — | 41 | — | — | — | — | — | — |
| a-4-1 | — | — | — | — | 46 | 42 | — | — | — | — |
| a-5-1 | 90.5 | 34 | 62.5 | 15 | — | — | 93 | 62.5 | 62.5 | 62.5 |
| a-6-1 | — | — | — | — | 23.3 | 20.7 | — | — | — | — |
| a-6-5 | — | — | 22.5 | — | — | — | — | 22.5 | — | — |
| a-6-6 | — | — | — | — | — | — | — | — | 22.5 | — |
| a-6-7 | — | — | — | — | — | — | — | — | — | 22.5 |
| a-7-1 | — | 45 | 14 | 43 | — | — | 6 | — | 14 1 | 14 |
| a-7-2 | — | — | — | — | — | — | — | 14 | — | — |
| a-7-5 | 8.5 | — | — | — | — | — | — | — | — | — |
| b-1 | 1 | 1 | 1 | 1 | 1 | 1 | 1 | 1 | 1 | 1 |
| Total | 100 | 100 | 100 | 100 | 100 | 100 | 100 | 100 | 100 | 100 |
| SH/Vi ratio | 1.2 | 1.2 | 1.2 | 1.0 | 0.9 | 1.0 | 0.8 | 1.2 | 1.5 | 1.3 |
| Evaluation |  |  |  |  |  |  |  |  |  |  |
| Residual weight (%) | 65 | 88 | 68 | 84 | 54 | 59 | 60 | 60 | 71 | 59 |

TABLE 5

|  | Example 42 | Example 43 | Example 44 | Example 45 | Example 46 | Example 47 | Example 48 | Example 49 | Example 50 | Example 51 | Example 52 | Example 53 |
|---|---|---|---|---|---|---|---|---|---|---|---|---|
| Component |  |  |  |  |  |  |  |  |  |  |  |  |
| a-1-1 | 42 | 28.8 | 42 | 28.8 | — | — | — | — | — | — | — | — |
| a-2-1 | — | — | — | — | 65 | — | — | 71 | — | — | — | — |
| a-2-2 | — | — | — | — | — | 75 | — | — | — | — | — | — |
| a-2-3 | — | — | — | — | — | — | 47 | — | — | — | — | — |
| a-3-1 | 24 | 46 | 24 | 46 | — | — | — | — | — | — | — | — |
| a-4-1 | — | — | — | — | 34 | 24 | 52 | — | — | — | — | — |
| a-4-2 | — | — | — | — | — | — | — | 28 | — | — | — | — |
| a-5-1 | — | — | — | — | — | — | — | — | 90.5 | 90.5 | 90.5 | 90.5 |
| a-6-1 | 33 | 22.7 | 33 | 22.7 | — | — | — | — | — | — | — | — |
| a-7-1 | — | — | — | — | — | — | — | — | 8.5 | 8.5 | 8.5 | 8.5 |
| b-1 | 0.91 | 2.27 | 0.8 | 2 | 1 | 1 | 1 | 1 | 1 | 0.66 | 0.91 | 0.8 |

TABLE 5-continued

|  | Example 42 | Example 43 | Example 44 | Example 45 | Example 46 | Example 47 | Example 48 | Example 49 | Example 50 | Example 51 | Example 52 | Example 53 |
|---|---|---|---|---|---|---|---|---|---|---|---|---|
| b-4 | — | — | — | — | — | — | — | — | — | 0.33 | — | — |
| b-5 | 0.09 | 0.23 | — | — | — | — | — | — | — | — | 0.09 | — |
| b-7 | — | — | 0.2 | 0.5 | — | — | — | — | — | — | — | 0.2 |
| Total | 100 | 100 | 100 | 100 | — | — | — | — | — | — | — | — |
| SH/Vi ratio | 0.9 | 2.54 | 0.9 | 2.54 | 1.2 | 1.2 | 1.2 | 1.2 | 1.2 | 1.2 | 1.2 | 1.2 |
| Evaluation |  |  |  |  |  |  |  |  |  |  |  |  |
| Residual weight (%) | 70 | 95 | 67 | 85 | 65 | 55 | 72 | 61 | 67 | 66 | 66 | 65 |

TABLE 6

|  | Comparative Example 1 | Comparative Example 2 | Comparative Example 3 | Comparative Example 4 | Comparative Exampl 5 | Comparative Example 6 | Comparative Example 7 | Comparative Example 8 | Comparative Example 9 |
|---|---|---|---|---|---|---|---|---|---|
| Component |  |  |  |  |  |  |  |  |  |
| a-1-1 | 90.7 | 90.7 | 90.7 | 90.7 | 90.7 | 90.7 | 95 | 90 | — |
| a-3-1 | 8.3 | 8.3 | 8.3 | 8.3 | 8.3 | 8.3 | 4 | — | — |
| a-3-3 | — | — | — | — | — | — | — | 9 | — |
| a-5-1 | — | — | — | — | — | — | — | — | 95 |
| a-7-1 | — | — | — | — | — | — | — | — | 4 |
| b-1 | — | — | 0.5 | — | 0.75 | — | 1 | 1 | 1 |
| b-7 | 1 | — | — | — | — | — | — | — | — |
| b'-1 | — | 1 | 0.5 | 0.99 | — | 0.91 | — | — | — |
| b'-2 | — | — | — | — | 0.25 | — | — | — | — |
| b'-3 | — | — | — | — | — | 0.09 | — | — | — |
| c | — | — | — | 0.01 | — | — | — | — | — |
| Total | 100 | 100 | 100 | 100 | 100 | 100 | 100 | 100 | 100 |
| SH/Vi ratio | 1.2 | 1.2 | 1.2 | 1.2 | 1.2 | 1.2 | 0.55 | 0.55 | 0.55 |
| Evaluation |  |  |  |  |  |  |  |  |  |
| Residual weight (%) | 40 | 20 | 20 | 20 | 20 | 40 | 40 | 30 | 20 |

TABLE 7

|  | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|
| Component |  |  |  |  |  |  |  |  |
| a-1-1 | 90.7 | 90.7 | 90.7 | 90.7 | 90.7 | 90.7 | 90.7 | 90.7 |
| a-3-1 | 8.3 | 8.3 | 8.3 | 8.3 | 8.3 | 8.3 | 8.3 | 8.3 |
| b-1 | — | — | 0.91 | — | — | — | — | — |
| b-7 | — | — | — | — | — | — | — | 1 |
| b'-4 | 1 | — | — | — | — | — | — | — |

TABLE 7-continued

|  | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|
| b'-5 | — | 1 | — | — | — | — | — | — |
| b'-6 | — | — | 0.09 | — | — | — | — | — |
| b'-7 | — | — | — | 1 | — | — | — | — |
| b'-8 | — | — | — | — | 1 | — | — | — |
| b'-9 | — | — | — | — | — | 1 | — | — |
| b'-10 | — | — | — | — | — | — | 1 | — |
| Total | 100 | 100 | 100 | 100 | 100 | 100 | 100 | 100 |
| SH/Vi ratio | 1.2 | 1.2 | 1.2 | 1.2 | 1.2 | 1.2 | 1.2 | 1.2 |
| Evaluation |  |  |  |  |  |  |  |  |
| State | Not mixed | Not mixed | Not mixed | Not mixed | Not mixed | Not mixed | Not mixed | Not mixed |

TABLE 8

|  | Comparative Example 18 | Comparative Example 19 | Comparative Example 20 | Comparative Example 21 | Comparative Example 22 | Comparative Example 23 | Comparative Example 24 | Comparative Example 25 | Comparative Example 26 | Comparative Example 27 | Comparative Example 28 | Comparative Example 29 |
|---|---|---|---|---|---|---|---|---|---|---|---|---|
| Component |  |  |  |  |  |  |  |  |  |  |  |  |
| a-5-1 | 90.5 | 90.5 | 90.5 | 90.5 | 90.5 | 96 | 90.5 | 90.5 | 90.5 | 90.5 | 90.5 | 90.5 |
| a-7-1 | 8.5 | 8.5 | 8.5 | 8.5 | 8.5 | 3 | — | — | — | — | — | — |
| a-7-6 | — | — | — | — | — | — | 8.5 | 8.5 | 8.5 | — | — | — |
| a-7-7 | — | — | — | — | — | — | — | — | — | — | — | 8.5 |
| a-7-8 | — | — | — | — | — | — | — | — | — | 8.5 | — | — |
| a-7-9 | — | — | — | — | — | — | — | — | — | — | 8.5 | — |
| b-1 | — | 0.91 | — | — | — | — | 1 | — | — | — | — | — |
| b-6 | — | — | — | — | — | — | — | 1 | — | — | — | — |
| b-7 | — | — | — | — | 1 | 1 | — | — | — | — | — | — |
| b'-1 | — | — | — | — | — | — | — | — | — | 0.91 | — | — |
| b'-3 | — | — | — | — | — | — | — | — | — | 0.09 | — | — |
| b'-5 | 1 | — | — | — | — | — | — | — | — | — | — | — |
| b'-6 | — | 0.09 | — | — | — | — | — | — | — | — | — | — |
| b'-7 | — | — | 1 | — | — | — | — | — | — | — | — | — |
| b'-8 | — | — | — | 1 | — | — | — | — | — | — | — | — |
| Total | 100 | 100 | 100 | 100 | 100 | 100 | 100 | 100 | 100 | 100 | 100 | 100 |
| SH/Vi ratio | 1.2 | 1.2 | 1.2 | 1.2 | 1.2 | 0.4 | 1.2 | 1.2 | 1.2 | 1.2 | 1.2 | 1.2 |
| Evaluation |  |  |  |  |  |  |  |  |  |  |  |  |
| State | Not mixed | Not mixed | Not mixed | Not mixed | Not mixed | Not cured | Not cured | Not cured | Not cured | Not mixed | Not mixed | Not mixed |

TABLE 9

| Component | Comparative Example 30 | Comparative Example 31 | Comparative Example 32 | Comparative Example 33 | Comparative Example 34 |
|---|---|---|---|---|---|
| a-1-1 | — | — | 69 | — | — |
| a'-3-5 | — | — | 30 | — | — |
| a-5-1 | 90.5 | 90.5 | — | 90.5 | 90.5 |
| a-7-1 | — | — | — | 8.5 | 8.5 |
| a-7-2 | 8.5 | — | — | — | — |
| a-7-3 | — | 8.5 | — | — | — |
| b-1 | 1 | 1 | 1 | — | — |
| b'-9 | — | — | — | 1 | — |
| b'-10 | — | — | — | — | 1 |
| Total | 100 | 100 | 100 | 100 | 100 |
| SH/Vi ratio | 1.2 | 1.2 | 1.2 | 1.2 | 1.2 |
| Evaluation | | | | | |
| Residual weight (%) | Not cured | Not cured | 30 | Not mixed | Not mixed |

The above results show that the UV curable silicone compositions of Examples 1 through 53 of the present disclosure had exceptional UV irradiation curability. The UV curable silicone compositions of the present disclosure thus

INDUSTRIAL APPLICABILITY

The UV curable silicone composition of the present disclosure is particularly useful in providing encapsulants for electronic devices, particularly optical semiconductor devices such as light emitting diodes (LEDs), semiconductor lasers, photodiodes, phototransistors, solid-state imaging, and light emitters and light receivers for photocouplers, as well as adhesive sheet films for mass transfer.

What is claimed is:

1. A UV curable silicone composition consisting of:
(A-1) an organopolysiloxane composition consisting of a linear organopolysiloxane in which both ends of the molecular chain are capped with alkenyl groups and/or a branched organopolysiloxane containing at least 2 alkenyl groups at the ends of the molecular chain, and an organopolysiloxane containing at least 2 thiol groups in side-chains of the molecular chain, wherein the thiol group content is 1% by mass or more per molecule,
(B) a silicone-miscible photo-initiator comprising a compound selected from the following:
(B-1) an alpha-hydroxyacetophenone,
(B-2) a combination of an alpha-hydroxyacetophenone and an alpha-aminoalkylphenone, or
(B-3) a combination of an alpha-hydroxyacetophenone and a mono-acylphosphine oxide, and
(C) one or more component selected from the group consisting of sensitizers, free radical scavengers, and polymerization inhibitors,
wherein the mole ratio between the thiol groups (—SH) and alkenyl groups (—SH/Vi ratio) included in the organopolysiloxane composition is 0.6 or more, and
wherein the photo-initiator (B) includes 0% by mass to 10 by mass of photo-initiator other than an alphahydroxyacetophenone alpha-aminoalkylphenone, or monoacylphosphine oxide, based on the total mass of component (B).

2. The UV curable silicone composition as claimed in claim 1, wherein the organopolysiloxane containing at least 2 thiol groups in side-chains of the molecular chain in component (A-1) is a cyclic structure.

3. The UV curable silicone composition as claimed in claim 1, wherein the photo-initiator of (B-1) further comprises a compound having an acetophenone structure other than alpha-hydroxyacetophenone.

4. The UV curable silicone composition as claimed in claim 1, wherein the content of component (B) is 0.001% by mass to 5% by mass based on the total mass of the UV curable silicone composition.

5. An encapsulant or sheet film comprising the cured product of the UV curable silicone composition as claimed in claim 1.

6. The UV curable silicone composition as claimed in claim 2, wherein the photo-initiator of (B-1) further comprises a compound having an acetophenone structure other than alpha-hydroxyacetophenone.

7. The UV curable silicone composition as claimed in claim 2, wherein the content of component (B) is 0.001% by mass to 5% by mass based on the total mass of the UV curable silicone composition.

8. A UV curable silicone composition consisting of:
(A-2) an organopolysiloxane composition consisting of a linear organopolysiloxane in which both ends of the molecular chain are capped with thiol groups, wherein the thiol group content is 1% by mass or more per molecule, and an organopolysiloxane containing at least 2 alkenyl groups in side-chains of the molecular chain and/or a resinous organopolysiloxane containing at least 2 alkenyl groups at the ends of the molecular chain,
(B) a silicone-miscible photo-initiator comprising a compound selected from the following:
(B-1) an alpha-hydroxyacetophenone,
(B-2) a combination of an alpha-hydroxyacetophenone and an alpha-aminoalkylphenone, or
(B-3) a combination of an alpha-hydroxyacetophenone and a mono-acylphosphine oxide, and
(C) one or more component selected from the group consisting of sensitizers, free radical scavengers, and polymerization inhibitors,
wherein the mole ratio between the thiol groups (—SH) and alkenyl groups (—SH/Vi ratio) included in the organopolysiloxane composition is 0.6 or more, and
wherein the photo-initiator (B) includes 0% by mass to 10 by mass of photo-initiator other than an alphahydroxyacetophenone alpha-aminoalkylphenone, or monoacylphosphine oxide, based on the total mass of component (B).

9. The UV curable silicone composition as claimed in claim 8, wherein the organopolysiloxane containing at least 2 alkenyl groups in side-chains of the molecular chain in component (A-2) is a linear structure.

10. The UV curable silicone composition as claimed in claim 8, wherein the photo-initiator of (B-1) further comprises a compound having an acetophenone structure other than alpha-hydroxyacetophenone.

11. The UV curable silicone composition as claimed in claim 8, wherein the content of component (B) is 0.001% by mass to 5% by mass based on the total mass of the UV curable silicone composition.

12. An encapsulant or sheet film comprising the cured product of the UV curable silicone composition as claimed in claim 8.

13. A UV curable silicone composition consisting of:
(A-3) an organopolysiloxane composition consisting of an alkenyl group- and aryl group-containing organopolysiloxane and a multifunctional thiol compound, provided that component (A-3) comprises an alkenyl group-containing resinous organopolysiloxane when the multifunctional thiol compound contains only a bifunctional thiol compound,
(B) a silicone-miscible photo-initiator comprising a compound selected from the following:
(B-1) an alpha-hydroxyacetophenone,
(B-2) a combination of an alpha-hydroxyacetophenone and an alpha-aminoalkylphenone, or
(B-3) a combination of an alpha-hydroxyacetophenone and a mono-acylphosphine oxide,
and
(C) one or more component selected from the group consisting of sensitizers, free radical scavengers, and polymerization inhibitors,
wherein the mole ratio between the thiol groups (—SH) and alkenyl groups (—SH/Vi ratio) included in the organopolysiloxane composition is 0.6 or more, and
wherein the photo-initiator (B) includes 0% by mass to 10 by mass of photo-initiator other than an alphahydroxyacetophenone alpha-aminoalkylphenone, or monoacylphosphine oxide, based on the total mass of component (B).

14. The UV curable silicone composition as claimed in claim 13, wherein the multifunctional thiol compound of component (A-3) is a compound containing 2 to 6 functional primary and secondary thiol groups.

15. The UV curable silicone composition as claimed in claim 13, wherein the photo-initiator of (B-1) further comprises a compound having an acetophenone structure other than alpha-hydroxyacetophenone.

16. The UV curable silicone composition as claimed in claim 13, wherein the content of component (B) is 0.001% by mass to 5% by mass based on the total mass of the UV curable silicone composition.

17. An encapsulant or sheet film comprising the cured product of the UV curable silicone composition as claimed in claim 13.

* * * * *